United States Patent
Yoshida et al.

(10) Patent No.: US 8,653,725 B2
(45) Date of Patent: *Feb. 18, 2014

(54) SPARK PLUG FOR INTERNAL-COMBUSTION ENGINE

(75) Inventors: Haruki Yoshida, Owariasahi (JP); Toshitaka Honda, Nagoya (JP)

(73) Assignee: NGK Spark Plug Co., Ltd, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/497,745

(22) PCT Filed: Aug. 19, 2010

(86) PCT No.: PCT/JP2010/005110
§ 371 (c)(1),
(2), (4) Date: Mar. 22, 2012

(87) PCT Pub. No.: WO2011/036845
PCT Pub. Date: Mar. 31, 2011

(65) Prior Publication Data
US 2012/0176021 A1    Jul. 12, 2012

(30) Foreign Application Priority Data
Sep. 25, 2009  (JP) ................. 2009-220422

(51) Int. Cl.
H01T 13/20    (2006.01)
(52) U.S. Cl.
USPC .......................... 313/141; 313/136
(58) Field of Classification Search
USPC ................ 313/141, 118, 136; 445/7
See application file for complete search history.

(56) References Cited

U.S. PATENT DOCUMENTS

| 5,008,584 | A | 4/1991 | Atsumi et al. |
| 2001/0007196 | A1* | 7/2001 | Sugimoto et al. ............ 65/32.1 |
| 2003/0030355 | A1* | 2/2003 | Honda ........................ 313/143 |
| 2005/0242694 | A1* | 11/2005 | Honda et al. ................ 313/118 |
| 2012/0126683 | A1* | 5/2012 | Yoshida et al. .............. 313/141 |

FOREIGN PATENT DOCUMENTS

| JP | 59-167984 A | 9/1984 |
| JP | 2800279 B2 | 9/1998 |
| JP | 11-043351 A | 2/1999 |
| JP | 2006-236906 A | 9/2006 |
| JP | 2006-261349 A | 9/2006 |

OTHER PUBLICATIONS

International Search Report mailed Nov. 22, 2010 for the corresponding PCT Application No. PCT/JP2010/005110.

* cited by examiner

Primary Examiner — Mariceli Santiago
Assistant Examiner — Glenn Zimmerman
(74) Attorney, Agent, or Firm — Leason Ellis LLP

(57) ABSTRACT

A spark plug that prevents a sharp increase in resistance of a resistor and materializes an excellent load life performance. The spark plug has a resistor formed by heat-sealing of a resistor composition that contains, at least, a conductive material and glass powder. The glass powder contains between 35.0 mol % and 69.8 mol % $SiO_2$, between 15.0 mol % and 49.8 mol % $B_2O_3$, between 5.0 mol % and 20.0 mol % Li2O, and at least one additive selected from MgO, CaO, SrO, BaO, $Na_2O$, $K_2O$, ZnO, and $ZrO_2$ in a total of between 2.6 mol % and 25.0 mol %. Further, the total content of $Li_2O$ and the additive(s) in the glass powder is between 15.2 mol % and 45.0 mol %, and the ratio of the $Li_2O$ content to the total content of the additive(s) is between 1.3 and 5.0.

10 Claims, 3 Drawing Sheets

SPARK PLUG FOR INTERNAL-COMBUSTION ENGINE

CROSS-REFERENCE TO RELATED PATENT APPLICATIONS

This application is a U.S. National Phase Application under U.S.C. §371 of International Patent Application No. PCT/JP2010/005110, filed Aug. 19, 2010, and claims the benefit of Japanese Patent Application No. 2009-220422, filed Sep. 25, 2009, all of which are incorporated by reference herein. The International Application was published in Japanese on Mar. 31, 2011 as International Publication No. WO/2011/036845 under PCT Article 21(2).

FIELD OF THE INVENTION

The present invention relates to a spark plug used for an internal-combustion engine.

BACKGROUND OF THE INVENTION

A spark plug is mounted on an internal-combustion engine, and is used for ignition to the air-fuel mixture in a combustion chamber. Generally, a spark plug includes an insulator having an axial bore, a center electrode inserted in a front end of the axial bore, a terminal electrode inserted in a rear end of the axial bore, and a metallic shell provided in an outer circumference of the insulator. Further, in the axial bore, a resistor used for preventing a radio noise due to an operation of the internal-combustion engine is provided between the center electrode and the terminal electrode (e.g., refer to Japanese Patent No. 2800279).

Generally, a resistor is formed by heat-sealing of a resistor composition that contains mainly a conductive material, such as carbon black, and ceramic particles (e.g., glass powder or the like). In the resistor, the conductive material covers the glass so as to form a plurality of electrical conduction paths for electrical connection between the electrodes. Thus, with forming many electric conduction paths, it is possible to effectively prevent a sharp increase in resistance, even though the electrical conduction path is somewhat damaged by oxidation due to electric load or the like.

Problem(s) to be Solved by the Invention

However, in connection with a recent demand of high power engines, a higher voltage is required for spark plugs, and a larger electrical load tends to be applied to a resistor compared to a previous case. Therefore, there is a possibility that an electric conduction path may be quickly damaged by oxidation or the like. Also, sudden increase in resistance of a resistor occurs, resulting in misfire (absence of spark discharge) at a relatively early stage.

The present invention has been accomplished in view of the above-mentioned problems, and an object of the present invention is to provide a spark plug for an internal-combustion engine capable of minimizing a sharp increase in resistance value of a resistor as well as materializing an excellent load life performance.

SUMMARY OF THE INVENTION

Means for Solving the Problem

Configurations suitable for achieving the above-described objects will be described in an itemized fashion. Notably, when necessary, effects particular to each configuration will be added.

Composition 1

A spark plug for internal-combustion engines, comprising:
a cylindrical insulator having an axial bore that penetrates in an axial direction;
a center electrode inserted in one end of the axial bore;
a terminal electrode inserted in another end of the axial bore;
a cylindrical metallic shell provided on an outer circumference of the insulator; and
a resistor made of at least a conductive material and glass, and electrically connecting the center electrode to the terminal electrode in the axial bore,
wherein the resistor is formed by heat-sealing of a resistor composition that contains at least the conductive material and glass powder,
wherein the glass powder contains 35.0 mol % or more to 69.8 mol % or less silica dioxide ($SiO_2$), 15.0 mol % or more to 49.8 mol % or less boron oxide ($B_2O_3$), 5.0 mol % or more to 20.0 mol % or less lithium oxide ($Li_2O$),
wherein the glass powder contains at least one additive selected from a magnesium oxide (MgO), a calcium oxide (CaO), a strontium oxide (SrO), a barium oxide (BaO), a sodium oxide ($Na_2O$), an potassium oxide ($K_2O$), a zinc oxide (ZnO) and a zirconium dioxide ($ZrO_2$) in a total of 2.6 mol % or more to 25.0 mol % or less,
wherein the total content of $Li_2O$ and the additive(s) is 15.2 mol % or more to 45.0 mol % or less, and
wherein a ratio of the $Li_2O$ content to the total content of the additive(s) is between 1.3 and 5.0.

Generally, the glass powder constituting the resistor composition is made of $SiO_2$ or $B_2O_3$ as a principle component. In order to secure sufficient melting properties at the time of heating, $Li_2O$ and the additive(s), such as BaO, MgO, are contained in the glass powder. When the inventor of this application studied on an effect of additives, such as Li and BaO, it was found that the content of Li and other additive(s) had a large effect on load life performance of the resistor. A remarkable improvement in load life performance is achievable by appropriately adjusting the content of Li and other additives.

In addition, when the content of $SiO_2$ or $B_2O_3$ is beyond the above-mentioned range, the melting properties of the glass deteriorate at the time of heating, whereby improvement in load life performance may not fully be exhibited.

Composition 2.

A spark plug for internal-combustion engines, comprising:
a cylindrical insulator having an axial bore that penetrates in an axial direction;
a center electrode inserted in one end of the axial bore;
a terminal electrode inserted in another end of the axial bore;
a cylindrical metallic shell provided on an outer circumference of the insulator; and
a resistor made of at least a conductive material and glass, and electrically connecting the center electrode to the terminal electrode in the axial bore,
wherein the resistor is formed by heat-sealing of a resistor composition that contains at least the conductive material and glass powder,
wherein the glass powder contains 35.0 mol % or more to 69.8 mol % or less $SiO_2$, 15.0 mol % or more to 49.8 mol % or less $B_2O_3$, 5.0 mol % or more to 20.0 mol % or less $Li_2O$, and
wherein the glass powder contains at least one additive selected from MgO, CaO, SrO, BaO, $Na_2O$, $K_2O$, ZnO and $ZrO_2$ in a total of 2.6 mol % or more to 25.0 mol % or less, and wherein the total content of $Li_2O$ and the additive(s) is 17.2 mol % or more to 45.0 mol % or less.

Composition 3.

In the Composition 1, the spark plug for internal-combustion engines according to this composition, wherein the total content of $Li_2O$ and the additive(s) in the glass powder is 17.2 mol % or more to 45.0 mol % or less.

Composition 4.

In any one of Compositions 1 to 3, the spark plug for internal-combustion engines according to this composition, wherein the total content of $Na_2O$ and $K_2O$ in the glass powder is 2.0 mol % or less.

As the content of $Na_2O$ and $K_2O$ in the glass powder increases, the resistance of the resistor also increases. Therefore, in order to obtain a desirable resistance value of the resistor, a larger amount of conductive materials is necessary to be contained in the resistor. However, increasing the content of conductive material may cause variation in resistance of the resistors among the products.

In addition, in order to securely preventing the variation in resistance of the resistor, the total content of $Na_2O$ and $K_2O$ is preferably 1.0 mol % or less.

Composition 5.

In any one of Compositions 1 to 4, the spark plug for internal-combustion engines according to this composition, wherein an outer diameter of the resistor is less than 3.0 mm.

Recently, since there has been a demand for slimmer spark plugs, i.e., a spark plug with a smaller diameter, diameter of an axial bore and that of a resistor allocated in the axial bore are reduction. However, when the diameter of a resistor is reduced, the electric load per unit area will further increase in the resistor. Therefore, the resistor having a reduced diameter is difficult to secure a sufficient load life performance.

Effect of the Invention

According to the spark plug of Composition 1, the glass powder contains 5.0 mol % or more to 20.0 mol % or less $Li_2O$, 2.6 mol % or more to 25.0 mol % or less additive(s), such as BaO, in total. Also, the total content of $Li_2O$ and the additive(s) in the glass powder is 15.2 mol % or more to 45.0 mol % or less, and the ratio (Y/X) of the $Li_2O$ (Y) content to the total content of additive(s) (X) is 1.3 or more to 5.0 or less. Thus, the load life performance of the resistor can be remarkably enhanced by adjustment of the additive content, such as $Li_2O$ and BaO.

According to the spark plug of Composition 2, the total content of $Li_2O$ and the additive(s) is 17.2 mol % or more to 45.0 mol % or less. Therefore, even if the ratio of the $Li_2O$ content to the total content of additives) is, for example, less than 1.3, the load life performance of the resistor can be remarkably enhanced.

According to the spark plug of Composition 3, the ratio of the $Li_2O$ content to the total content of the additive(s) is 1.3 or more to 5.0 or less, and the total content of $Li_2O$ and the additive(s) is 17.2 mol % or more. Thus, the load life performance can be further enhanced.

According to the spark plug of Composition 4, the total content of $Na_2O$ and $K_2O$ is 2.0 mol % or less. Thus, in order to obtain a desirable resistance of the resistor, it is not necessary to increase the amount of the conductive materials. As a result, variation in resistance of the resistor can be assuredly prevented.

Since the resistor of Composition 5 has the reduced outer diameter to less than 3.0 mm, it is difficult to secure the sufficient load life performance. However, excellent load life performance is achievable by satisfying Composition 1 and the like. That is, the above compositions are especially effective, when the outer diameter of the resistor is less than 3.0 mm.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Mode for Carrying Out the Invention

Figure 1:
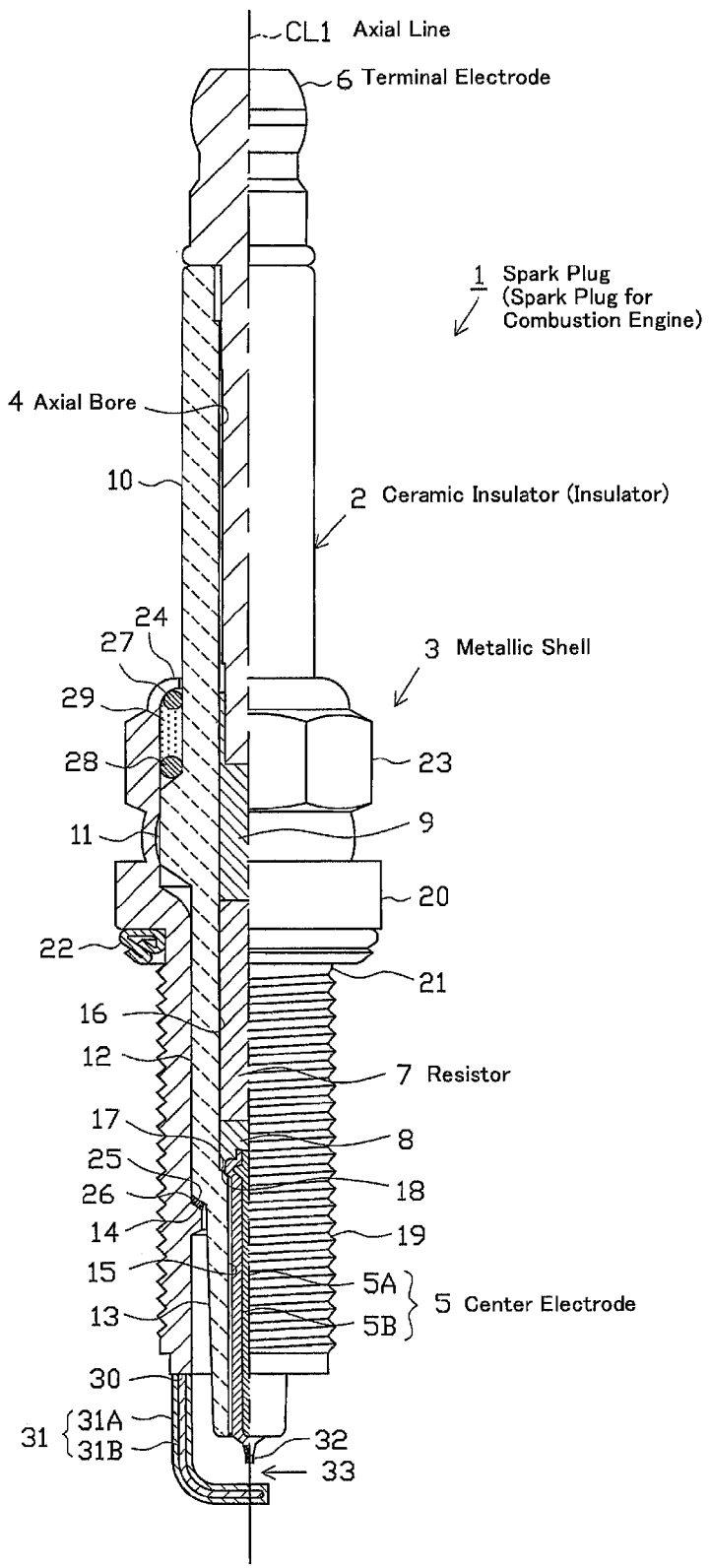
FIG. 1 is a partially sectioned front view showing a composition of a spark plug according to an embodiment.

An embodiment of the present invention will be described with reference to the drawings, FIG. 1 shows a partially sectioned front view of a spark plug 1 for an internal-combustion engine (hereinafter referred to as the "spark plug"). In the following description, the direction of an axis CL1 of the spark plug 1 in FIG. 1 is referred to as the vertical direction, and the lower side of the spark plug 1 in FIG. 1 is referred to as the front side of the spark plug 1, and the upper side as the rear side of the spark plug 1.

The spark plug 1 includes a tubular ceramic insulator 2, which serves as an insulator, and a tubular metallic shell 3, which holds the ceramic insulator 2.

The ceramic insulator 2 is formed from alumina or the like by firing, as well known in the art. The ceramic insulator 2 externally includes a rear trunk portion 10 formed on the rear side; a large-diameter portion 11, which is located frontward of the rear trunk portion 10 and projects radially outward; an intermediate trunk portion 12, which is located frontward of the large-diameter portion 11 and is smaller in diameter than the large-diameter portion 11; and a leg portion 13, which is located frontward of the intermediate trunk portion 12 and is smaller in diameter than the intermediate trunk portion 12. The large-diameter portion 11, the intermediate trunk portion 12, and most of the leg portion 13 are accommodated in the metallic shell 3. A tapered portion 14, which is tapered frontward, is formed at a connection portion between the leg portion 13 and the intermediate trunk portion 12. The ceramic insulator 2 is seated on the metallic shell 3 via the stepped portion 14.

Further, the ceramic insulator 2 has an axial bore 4 extending therethrough along the axis CL1. The axial bore 4 has a small-diameter portion 15 formed at a front end portion thereof, and a large-diameter portion 16, which is located rearward of the small-diameter portion 15 and is greater in inner diameter than the small-diameter portion 15. A tapered, stepped portion 17 is formed between the small-diameter portion 15 and the large-diameter portion 16.

Additionally, a center electrode 5 is fixedly inserted into a front end portion (small-diameter portion 15) of the axial bore 4. More specifically, the center electrode 5 has an expanded portion 18 formed at a rear end portion thereof and expanding in a direction toward the outer circumference thereof. The center electrode 5 is fixed in a state in which the expanded portion 18 is seated on the stepped portion 18 of the axial bore 4. The center electrode 5 includes an inner layer 5A of copper or a copper alloy, and an outer layer 5B of an Ni alloy which contains nickel (Ni) as a main component. The center electrode 5 assumes a rodlike (circular columnar) shape as a whole and has a front end portion projecting from the front end of the ceramic insulator 2. In addition, a noble metal tip 32 made of a noble metal alloy (e.g., a platinum alloy or the like) is joined to the front end portion of the center electrode 5.

Also, a terminal electrode 6 is fixedly inserted into the rear side (large-diameter portion 16) of the axial bore 4 and projects from the rear end of the ceramic insulator 2.

Further, a circular columnar resistor 7 is disposed within the axial bore 4 between the center electrode 5 and the terminal electrode 6. As will be described in detail later, the resistor 7 is formed through heating and sealing of a resistor composition made from a conductive material and glass powder, etc. Additionally, opposite end portions of the resistor 7 are electrically connected to the center electrode 5 and the terminal electrode 6 via conductive glass seal layers 8 and 9, respectively. In addition, in this embodiment, the axial bore 4 is reduced in diameter due to the miniaturization (reduced diameter) of the spark plug 1. Therefore, the resistor 7 accommodated in the axial bore 4 has an outer diameter of less than 3.0 mm.

Additionally, the metallic shell 3 is formed from a low-carbon steel or the like and is formed into a tubular shape. The metallic shell 3 has a threaded portion (externally threaded portion) 19 on its outer circumferential surface, and the threaded portion 19 is used to mount the spark plug 1 to an engine head. The metallic shell 3 has a seat portion 20 formed on its outer circumferential surface and located rearward of the threaded portion 19. A ring-like gasket 22 is fitted to a screw neck 21 located at the rear end of the threaded portion 19. The metallic shell 3 also has a tool engagement portion 23 provided near its rear end. The tool engagement portion 23 has a hexagonal cross section and allows a tool such as a wrench to be engaged therewith when the metallic shell 3 is to be mounted to the engine head. Further, the metallic shell 3 has a crimp portion 24 provided at its rear end portion and adapted to hold the ceramic insulator 2.

The metallic shell 3 has a tapered stepped portion 25 provided on the front side of its inner circumferential surface and adapted to allow the ceramic insulator 2 to be seated thereon. The ceramic insulator 2 is inserted frontward into the metallic shell 3 from the rear end of the metallic shell 3. In a state in which the first stepped portion 14 of the ceramic insulator 2 butts against the stepped portion 25 of the metallic shell 3, a rear-end opening portion of the metallic shell 3 is crimped radially inward; i.e., the crimp portion 24 is formed, whereby the ceramic insulator 2 is fixed in place. An annular sheet packing 26 intervenes between the stepped portion 14 and the stepped portion 25. This retains gastightness of a combustion chamber and prevents leakage of an air-fuel mixture to the exterior of the spark plug 1 through a clearance between the inner circumferential surface of the metallic shell 3 and the leg portion 13 of the ceramic insulator 2, which leg portion 13 is exposed to the combustion chamber.

Further, in order to ensure gastightness which is established by crimping, annular ring members 27 and 28 intervene between the metallic shell 3 and the ceramic insulator 2 in a region near the rear end of the metallic shell 3, and a space between the ring members 27 and 28 is filled with a powder of talc 29. That is, the metallic shell 3 holds the ceramic insulator 2 via the sheet packing 26, the ring members 27 and 28, and the talc 29.

Also, a ground electrode 31 is joined to a front end portion 30 of the metallic shell 3. More specifically, a proximal end portion of the ground electrode 31 is welded to the front end portion 30 of the metallic shell 3, and a distal end portion of the ground electrode 31 is bent such that a side surface of the distal end portion faces a front end portion (noble metal tip 32) of the center electrode 5. Further, a spark discharge gap 33 is formed between the front end face of the noble metal tip 32 and a front end portion of the ground electrode 31. Additionally, the ground electrode 31 has a 2-layer structure consisting of an outer layer 31A and an inner layer 31B. In the present embodiment, the outer layer 31A is formed of an Ni alloy [e.g., INCONEL 600 or INCONEL 601 (registered trademark)]. The inner layer 31B is formed of a copper alloy or copper, which is superior in heat conduction to the Ni alloy.

Figure 2:
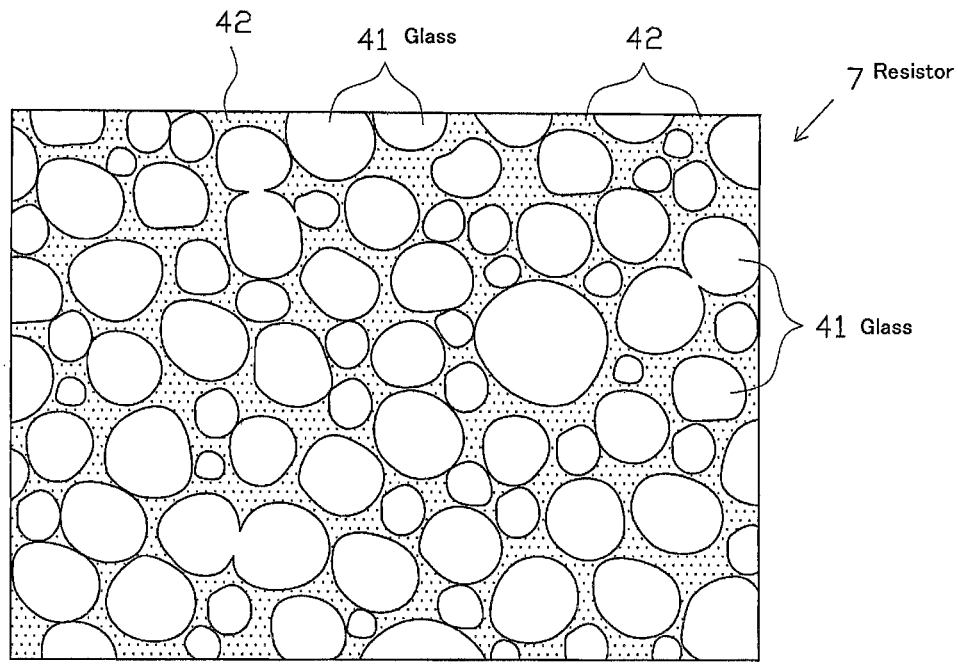
FIG. 2 is an enlarged-sectioned diagram of glass or the like in a resistor.
Figure 3:
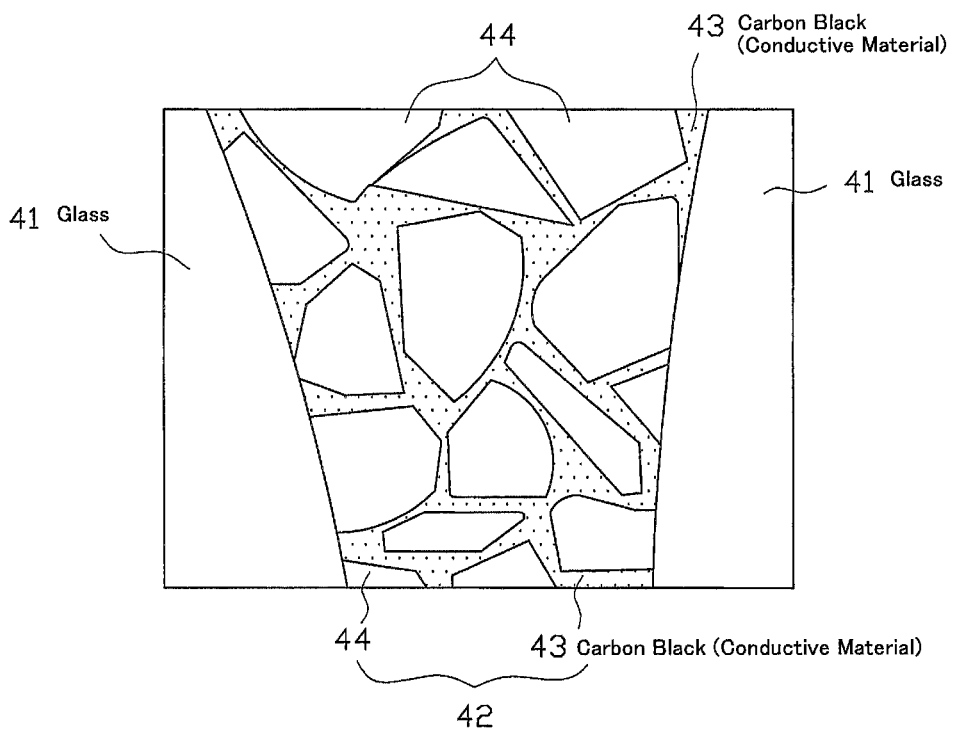
FIG. 3 is a partially enlarged sectional diagram showing a composition of an electric conduction path.

Next, the resistor 7 will be described. As mentioned above, the resistor 7 is formed through heat-sealing of a resistor composition that contains a conductive material and glass powder. As shown in FIG. 2 (FIG. 2 shows an enlarged sectional view of the resistor 7), the resistor 7 is constituted by sintered glass powder 41 and conductive paths 42 (represented by dotting in FIG. 2) that cover the sintered glass powder 41. As shown in FIG. 3, the conductive paths 42 consist of the carbon black 43 (represented by dotting in FIG. 3) and ceramic particles [e.g., zirconium oxide ($ZrO_2$) particles and titanium oxide ($TiO_2$) particles]44. In the present embodiment, the resistor 7 contains the sintered glass powder 41 in an amount of 80 vol % or more.

Furthermore, in this embodiment, the glass powder which constitutes the resistor composition contains 35.0 mol % or more to 69.8 mol % or less $SiO_2$, 15.0 mol % or more to 49.8 mol % or less $B_2O_3$, 5.0 mol % or more to 20.0 mol % or less $Li_2O$. Also, the glass powder contains at least one additive selected from MgO, CaO, SrO, BaO, $Na_2O$, $K_2O$, ZnO and $ZrO_2$ (these eight substances are referred to as "additives") in a total of 2.6 mol % or more to 25.0 mol % or less.

Furthermore, the total content of $Li_2O$ and the additive(s) in the glass powder is 15.2 mol % or more to 45.0 mol % or less, while the ratio of the $Li_2O$ content to the total content of the additive(s) is between 1.3 and 5.0 (preferably 1.4 or more to 5.0 or less, more preferably, 1.5 or more to 4.6 or less). That is, the $Li_2O$ content in the glass powder is 1.3 to 5.0 times of the total content of the additive(s) (preferably 1.4 to 5.0 times, more preferably 1.5 to 4.6 times).

In addition, the total content of $Li_2O$ and the additive(s) in the glass powder and the ratio of the $Li_2O$ content to the total content of the additive(s) can be modified as follows. That is, without limiting the ratio of the $Li_2O$ content to the total content of the additive(s), the total content of $Li_2O$ and the additive(s) may be 17.2 mol % or more to 45.0 mol % (preferably, 18.0 mol % or more to 36.0 mol % or less, more preferably 19.1 mol % or more to 36.0 mol % or less).

Further, while the ratio of the $Li_2O$ content to the total content of the additive(s) is to be 1.3 or more to 5.0 or less, the total content of $Li_2O$ and the additive(s) may be 17.2 mol % or more to 45.0 mol % or less (preferably 18.0 mol % or more to 36.0 mol % or less, more preferably, 19.1 mol % or more to 36.0 mol % or less).

In addition, in this embodiment, the total content of $Na_2O$ and $K_2O$ in the additives is set to be a relatively small quantity to 0.0 mol % or more to 2.0 mol % or less. Additionally, the glass powder may contain neither $Na_2O$ nor $K_2O$.

Next, a method for manufacturing the spark plug 1 configured as mentioned above will be described.

First, the metallic shell 3 is formed beforehand. Specifically, a circular columnar metal material (e.g., an iron-based material, such as S17C or S25C, or a stainless steel material) is subjected to cold forging so as to form a through hole, thereby forming a general shape. Subsequently, machining is conducted so as to adjust the outline, thereby yielding a metallic-shell intermediate.

Subsequently, the ground electrode 31 formed of an Ni alloy or the like is resistance-welded to the front end surface of the metallic-shell intermediate. The resistance welding is accompanied by formation of so-called "sags." After the "sags" are removed, the threaded portion 19 is formed in a predetermined region of the metallic-shell intermediate by rolling. Thus, the metallic shell 3 to which the ground electrode 31 is welded is obtained. The metallic shell 3 to which the ground electrode 31 is welded is subjected to galvanization or nickel plating. In order to enhance corrosion resistance, the plated surface may be further subjected to chromate treatment.

Separately from preparation of the metallic shell 3, the ceramic insulator 2 is formed. For example, a forming material granular-substance is prepared by use of a material powder which contains alumina in a predominant amount, a binder, etc. By use of the prepared forming material granular-substance, a tubular green compact is formed by rubber press forming. The thus-formed green compact is subjected to grinding for shaping. The shaped green compact is placed in a kiln, followed by firing, thereby yielding the ceramic insulator 2.

Separately from preparation of the metallic shell 3 and the insulator 2, the center electrode 5 is formed. Specifically, an Ni alloy prepared such that a copper alloy is disposed in a central portion thereof for enhancing heat radiation is subjected to forging, thereby forming the center electrode 5. The above-mentioned noble metal tip 32 is joined to a front end portion of the center electrode 5 by laser welding or the like.

Further, a powdery resistor composition used to form the resistor 7 is prepared. More specifically, first, the carbon black 53, the ceramic particles 54, and a predetermined binder are measured out and mixed while water is used as a medium. The resultant slurry is dried. The dried substance is mixed with glass powder to thereby form a resistor composition.

Figure 4:
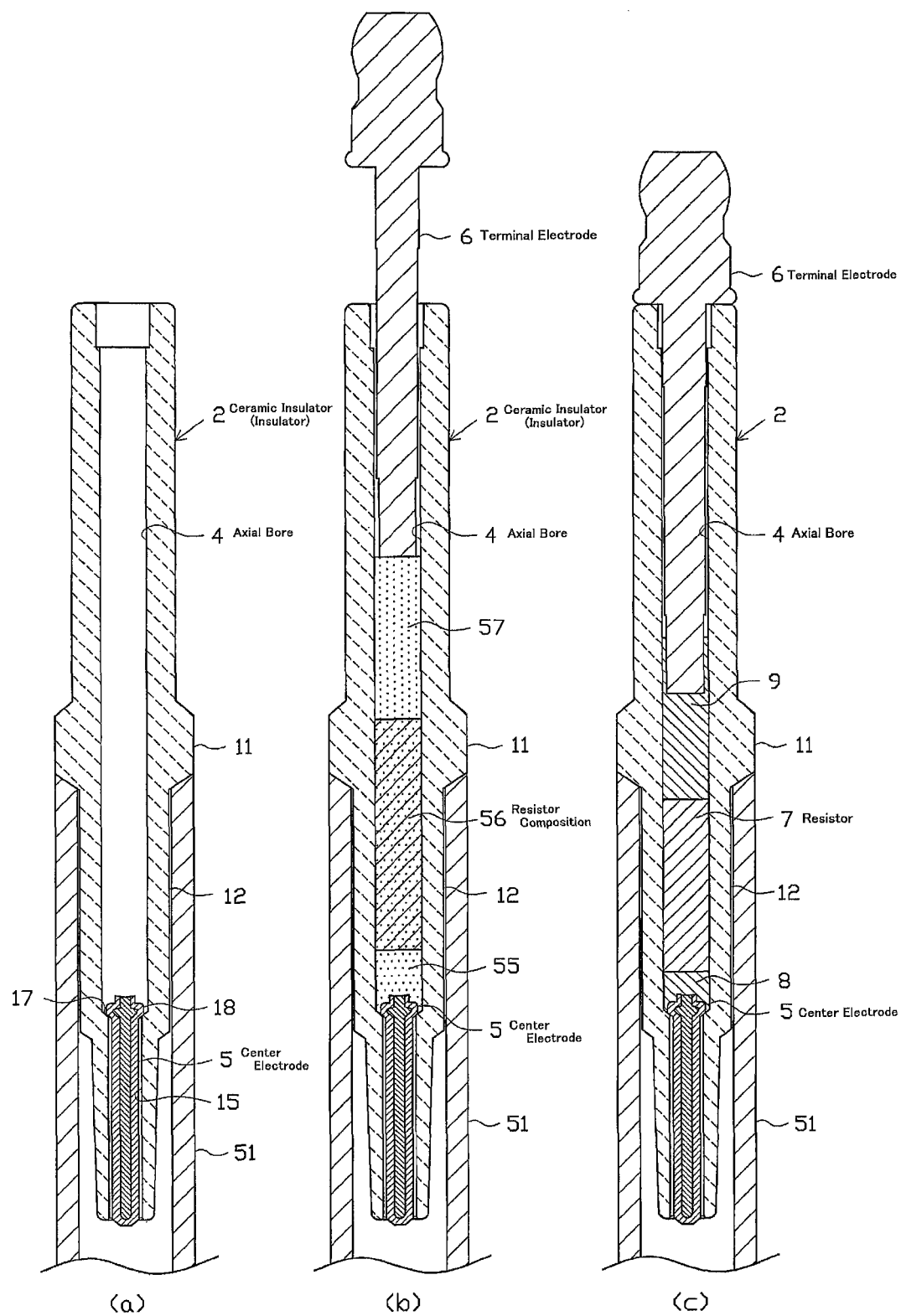
FIG. 4(a) to (c) are sectional views of a ceramic insulator or the like, which show a stage of a manufacturing method of the spark plug according to the present embodiment.

Next, the ceramic insulator 2 and the center electrode 5, which are formed as mentioned above, the resistor 7, and the terminal electrode 6 are fixed in a sealed condition by means of the glass seal layers 8 and 9. More specifically, first, as shown in FIG. 4(*a*), the end surface of a support tube 51 made of metal supports the stepped portion 17, thereby supporting the ceramic insulator 2. Then, the center electrode 5 is inserted into the small-diameter portion 15 of the axial bore 4. At this time, the expanded portion 18 of the center electrode 5 butts against the stepped portion 17 of the axial bore 4.

Subsequently, as shown in FIG. 4(*b*), conductive glass powder 55, which is generally prepared by mixing borosilicate glass and metal powder, is charged into the axial bore 4. The charged conductive glass powder 55 is preliminarily compressed. Next, a resistor composition 56 is charged into the axial bore 4 and preliminarily compressed in the similar manner. Further, conductive glass powder 57 is charged and also preliminarily compressed. Then, in a state in which the terminal electrode 6 is pressed into the axial bore 4 from the side opposite the center electrode 5, the resultant assembly is heated in a kiln at a predetermined temperature (in the present embodiment, 800° C. to 1000° C.) equal to or higher than the softening point of glass. In addition, the heating temperature is preferably modified according to a composition or the like of the glass powder that constitutes the resistor composition 56.

By this procedure, as shown in FIG. 4(*c*), the resistor composition 56 and the conductive glass powders 55 and 57 in a stacked condition are compressed and sintered, thereby yielding the resistor 7 and the glass seal layers 8 and 9. Also, the ceramic insulator 2 and the center electrode 5, the resistor 7, and the terminal electrode 6 are fixed in a sealed condition by means of the glass seal layers 8 and 9. In this heating process within the kiln, glaze applied to the surface of the rear trunk portion 10 of the ceramic insulator 2 may be simultaneously fired so as to form a glaze layer; alternatively, the glaze layer may be formed beforehand.

Subsequently, the thus-formed ceramic insulator 2 having the center electrode 5, the resistor 7, etc., and the metallic shell 3 having the ground electrode 31 are assembled together. More specifically, a relatively thin-walled rear-end opening portion of the metallic shell 3 is crimped radially inward; i.e., the above-mentioned crimp portion 24 is formed, thereby fixing the ceramic insulator 2 and the metallic shell 3 together.

Finally, the ground electrode 31 is bent so as to form the spark discharge gap 33 between the noble metal tip 32 provided on the front end of the center electrode 5 and the ground electrode 31. Thus, the spark plug 1 is yielded.

As described in detail above, according to the present embodiment, the glass powder which constitutes the resistor composition 56 contains 5.0 mol % or more to 20.0 mol % or less $Li_2O$, 2.6 mol % or more to 25.0 mol % or less additive(s), such as BaO, in total. Also, the total content of $Li_2O$ and the additive(s) in the glass powder is 15.2 mol % or more to 45.0 mol % or less, and the ratio (Y/X) of the $Li_2O$ content (Y) to the total content (X) of the additive(s) is 1.3 or more to 5.0 or less. Thus, the load life performance of the resistor 7 can be remarkably enhanced by appropriate adjustment of $Li_2O$ and the additive(s), such as BaO, contents.

Furthermore, since the total content of $Na_2O$ and $K_2O$ in the glass powder is 2.0 mol % or less, it is not necessary to increase the amount of carbon black 53 in order to obtain a predetermined resistance of the resistor 7. As a result, a predetermined resistance can be more accurately imparted to the resistor 7 with restraint of variation in resistance of the resistor 7 among manufactured spark plugs.

Next, in order to verify actions and effects which the present embodiment yields, a plurality of spark plug samples each having different resistor were fabricated while varying the content (mol %) of $SiO_2$, $B_2O_3$ and $Li_2O$, and that of the additive(s), such as CaO and BaO, as well as varying the ratio (Y/X) of the $Li_2O$ content (Y) to the total content (X) of the additive(s). Each sample was subjected to tests on load life performance and resistance value evaluation. A plurality of samples is produced for each test using a resistor formed in the same conditions, The outline of the load life performance test is as follows. Each sample was mounted on a transistor igniter used for automobiles to discharge 3600 times per minute with the voltage of 20 kV at a temperature of 350 degrees C. Then, a period of time (lifetime) that the resistance became 100 kΩ or more at a room temperature was measured. Evaluation criteria were as follows: when a sample had the lifetime of 180 hours or more, evaluation was "○ (good);" when a sample had the lifetime of 250 hours or more, evaluation was "◉ (excellent);" and when a sample had the lifetime of less than 180 hours, evaluation was "X (poor)".

Moreover, the outline of the resistance value evaluation is as follows. The samples were measured for three times the standard deviation of resistance of the resistor (3σ). Permissible differences (tolerances) were determined for resistance of the resistor. The process capability index (Cp) was calculated for each of the tolerances. Evaluation criteria were as follows: when the process capability index (Cp) was 1.67 or greater, evaluation was "⊚ (excellent);" when the process capability index (Cp) was 1.33 or greater, evaluation was "○ (good);" and when the process capability index (Cp) was less than 1.33, evaluation was "X (poor)." The term "process capability index" means a value obtained by dividing a tolerance by six times the standard deviation (6σ).

Tables 1 and 2 show, with respect to the samples, each content of $SiO_2$, $B_2O_3$ and $Li_2O$, and the additive(s), such as CaO and BaO, the total content of the additive(s), the total content of $Li_2O$ and the additive(s), the ratio (Y/X) of the $Li_2O$ content (Y) to the total content (X) of the additive(s), the lifetime and the lifetime evaluation on load life performance test and the results of resistance value evaluation (resistance value evaluation). Samples 1-59 had a resistor with an outer diameter of 2.9 mm, and samples 60 and 61 had a resistor with an outer diameter of 3.0 mm.

TABLE 1

| No. | Resistor Outer Diameter (mm) | $SiO_2$ (mol %) | $B_2O_3$ (mol %) | $Li_2O$ (mol %) | Additives (mol %) | | | | | | | | Total Content of Additives (mol %) | $Li_2O$ + Additives (mol %) | Y/X | Lifetime (h) | Lifetime Evaluation | Resistance Value Evaluation |
|---|---|---|---|---|---|---|---|---|---|---|---|---|---|---|---|---|---|---|
| | | | | | CaO | BaO | MgO | SrO | ZnO | $ZrO_2$ | $K_2O$ | $Na_2O$ | | | | | | |
| 1 | 2.9 | 55.0 | 30.0 | 8.5 | 6.5 | | | | | | | | 6.5 | 15.0 | 1.3 | 150 | X | ⊚ |
| 2 | 2.9 | 35.0 | 20.0 | 25.5 | 19.5 | | | | | | | | 19.5 | 45.0 | 1.3 | 170 | X | ⊚ |
| 3 | 2.9 | 33.0 | 21.0 | 20.0 | 26.0 | | | | | | | | 26.0 | 46.0 | 0.8 | 130 | X | ⊚ |
| 4 | 2.9 | 52.0 | 32.0 | 8.0 | 8.0 | | | | | | | | 8.0 | 16.0 | 1.0 | 160 | X | ⊚ |
| 5 | 2.9 | 54.8 | 30.0 | 8.2 | 7.0 | | | | | | | | 7.0 | 15.2 | 1.2 | 145 | X | ⊚ |
| 6 | 2.9 | 50.1 | 34.0 | 13.3 | 2.6 | | | | | | | | 2.6 | 15.9 | 5.1 | 160 | X | ⊚ |
| 7 | 2.9 | 70.8 | 14.0 | 8.6 | 6.6 | | | | | | | | 6.6 | 15.2 | 1.3 | 170 | X | ⊚ |
| 8 | 2.9 | 34.8 | 50.0 | 8.6 | 6.6 | | | | | | | | 6.6 | 15.2 | 1.3 | 160 | X | ⊚ |
| 9 | 2.9 | 55.0 | 29.8 | 8.6 | 6.6 | | | | | | | | 6.6 | 15.2 | 1.3 | 180 | ○ | ⊚ |
| 10 | 2.9 | 54.8 | 30.0 | 8.7 | 6.5 | | | | | | | | 6.5 | 15.2 | 1.3 | 190 | ○ | ⊚ |
| 11 | 2.9 | 69.8 | 15.0 | 8.6 | 6.6 | | | | | | | | 6.6 | 15.2 | 1.3 | 180 | ○ | ⊚ |
| 12 | 2.9 | 35.0 | 49.8 | 8.6 | 6.6 | | | | | | | | 6.6 | 15.2 | 1.3 | 180 | ○ | ⊚ |
| 13 | 2.9 | 54.5 | 30.3 | 8.8 | 6.4 | | | | | | | | 6.4 | 15.2 | 1.4 | 195 | ○ | ⊚ |
| 14 | 2.9 | 51.7 | 33.1 | 8.9 | 6.3 | | | | | | | | 6.3 | 15.2 | 1.4 | 200 | ○ | ⊚ |
| 15 | 2.9 | 49.8 | 35.0 | 9.0 | 6.2 | | | | | | | | 6.2 | 15.2 | 1.5 | 205 | ○ | ⊚ |
| 16 | 2.9 | 54.8 | 30.3 | 9.3 | 5.9 | | | | | | | | 5.9 | 15.2 | 1.6 | 210 | ○ | ⊚ |
| 17 | 2.9 | 51.7 | 33.1 | 9.5 | 5.7 | | | | | | | | 5.7 | 15.2 | 1.7 | 215 | ○ | ⊚ |
| 18 | 2.9 | 49.8 | 35.0 | 10.1 | 5.1 | | | | | | | | 5.1 | 15.2 | 2.0 | 230 | ○ | ⊚ |
| 19 | 2.9 | 54.1 | 30.3 | 13.0 | 2.6 | | | | | | | | 2.6 | 15.6 | 5.0 | 200 | ○ | ⊚ |
| 20 | 2.9 | 52.0 | 32.3 | 8.9 | 6.8 | | | | | | | | 6.8 | 15.7 | 1.3 | 210 | ○ | ⊚ |
| 21 | 2.9 | 51.1 | 33.1 | 13.0 | 2.8 | | | | | | | | 2.8 | 15.8 | 4.6 | 210 | ○ | ⊚ |
| 22 | 2.9 | 53.3 | 30.7 | 9.1 | 6.9 | | | | | | | | 6.9 | 16.0 | 1.3 | 215 | ○ | ⊚ |
| 23 | 2.9 | 49.0 | 35.0 | 13.0 | 3.0 | | | | | | | | 3.0 | 16.0 | 4.3 | 215 | ○ | ⊚ |
| 24 | 2.9 | 53.8 | 30.0 | 9.2 | 7.0 | | | | | | | | 7.0 | 16.2 | 1.3 | 220 | ○ | ⊚ |
| 25 | 2.9 | 49.7 | 33.1 | 5.0 | 12.2 | | | | | | | | 12.2 | 17.2 | 0.4 | 180 | ○ | ⊚ |
| 26 | 2.9 | 55.0 | 27.8 | 8.6 | 8.6 | | | | | | | | 8.6 | 17.2 | 1.0 | 188 | ○ | ⊚ |
| 27 | 2.9 | 48.9 | 33.1 | 5.0 | 13.0 | | | | | | | | 13.0 | 18.0 | 0.4 | 186 | ○ | ⊚ |
| 28 | 2.9 | 40.0 | 32.0 | 8.0 | 20.0 | | | | | | | | 20.0 | 28.0 | 0.4 | 185 | ○ | ⊚ |
| 29 | 2.9 | 37.0 | 23.0 | 15.0 | 25.0 | | | | | | | | 25.0 | 40.0 | 0.6 | 190 | ○ | ⊚ |

TABLE 2

| No. | Resistor Outer Diameter (mm) | $SiO_2$ (mol %) | $B_2O_3$ (mol %) | $Li_2O$ (mol %) | Additives (mol %) | | | | | | | | Total Content of Additives (mol %) | $Li_2O$ + Additives (mol %) | Y/X | Lifetime (h) | Lifetime Evaluation | Resistance Value Evaluation |
|---|---|---|---|---|---|---|---|---|---|---|---|---|---|---|---|---|---|---|
| | | | | | CaO | BaO | MgO | SrO | ZnO | $ZrO_2$ | $K_2O$ | $Na_2O$ | | | | | | |
| 30 | 2.9 | 55.0 | 27.8 | 9.8 | | 7.4 | | | | | | | 7.4 | 17.2 | 1.3 | 300 | ⊚ | ⊚ |
| 31 | 2.9 | 55.0 | 27.8 | 10.0 | | 7.2 | | | | | | | 7.2 | 17.2 | 1.4 | 315 | ⊚ | ⊚ |
| 32 | 2.9 | 55.0 | 27.8 | 10.2 | | 7.0 | | | | | | | 7.0 | 17.2 | 1.5 | 320 | ⊚ | ⊚ |
| 33 | 2.9 | 55.0 | 27.8 | 10.4 | | 6.8 | | | | | | | 6.8 | 17.2 | 1.5 | 330 | ⊚ | ⊚ |
| 34 | 2.9 | 48.9 | 33.1 | 10.2 | 3.6 | 3.6 | | | | | | | 7.2 | 17.4 | 1.4 | 303 | ⊚ | ⊚ |
| 35 | 2.9 | 48.9 | 33.1 | 10.2 | 3.6 | | 3.6 | | | | | | 7.2 | 17.4 | 1.4 | 305 | ⊚ | ⊚ |
| 36 | 2.9 | 48.9 | 33.1 | 10.2 | 3.6 | | | 3.6 | | | | | 7.2 | 17.4 | 1.4 | 307 | ⊚ | ⊚ |
| 37 | 2.9 | 48.9 | 33.1 | 10.2 | 3.6 | | | | 3.6 | | | | 7.2 | 17.4 | 1.4 | 307 | ⊚ | ⊚ |
| 38 | 2.9 | 48.9 | 33.1 | 10.2 | 3.6 | | | | | 3.6 | | | 7.2 | 17.4 | 1.4 | 310 | ⊚ | ⊚ |
| 39 | 2.9 | 48.9 | 33.1 | 10.2 | 2.5 | 4.7 | | | | | | | 7.2 | 17.4 | 1.4 | 300 | ⊚ | ⊚ |
| 40 | 2.9 | 48.9 | 33.1 | 10.2 | | 7.8 | | | | | | | 7.8 | 18.0 | 1.3 | 300 | ⊚ | ⊚ |
| 41 | 2.9 | 48.9 | 33.1 | 10.2 | 7.8 | | | | | | | | 7.8 | 18.0 | 1.3 | 300 | ⊚ | ⊚ |
| 42 | 2.9 | 48.9 | 33.1 | 10.5 | 7.5 | | | | | | | | 7.5 | 18.0 | 1.4 | 315 | ⊚ | ⊚ |
| 43 | 2.9 | 48.9 | 33.1 | 10.5 | | 7.5 | | | | | | | 7.5 | 18.0 | 1.4 | 313 | ⊚ | ⊚ |
| 44 | 2.9 | 48.9 | 33.1 | 10.7 | | 7.3 | | | | | | | 7.3 | 18.0 | 1.5 | 315 | ⊚ | ⊚ |

TABLE 2-continued

| No. | Resistor Outer Diameter (mm) | SiO$_2$ (mol %) | B$_2$O$_3$ (mol %) | Li$_2$O (mol %) | CaO | BaO | MgO | SrO | ZnO | ZrO$_2$ | K$_2$O | Na$_2$O | Total Content of Additives (mol %) | Li$_2$O + Additives (mol %) | Y/X | Lifetime (h) | Lifetime Evaluation | Resistance Value Evaluation |
|---|---|---|---|---|---|---|---|---|---|---|---|---|---|---|---|---|---|---|
| 45 | 2.9 | 47.8 | 33.1 | 10.7 | 7.3 | | | | | | | | 7.3 | 18.0 | 1.5 | 320 | ◎ | ◎ |
| 46 | 2.9 | 48.9 | 33.1 | 11.2 | | 6.8 | | | | | | | 6.8 | 18.0 | 1.7 | 320 | ◎ | ◎ |
| 47 | 2.9 | 47.8 | 33.1 | 11.2 | 6.8 | | | | | | | | 6.8 | 18.0 | 1.7 | 330 | ◎ | ◎ |
| 48 | 2.9 | 49.0 | 33.0 | 11.9 | | 6.1 | | | | | | | 6.1 | 18.0 | 2.0 | 400 | ◎ | ◎ |
| 49 | 2.9 | 47.8 | 33.1 | 10.8 | | 8.3 | | | | | | | 8.3 | 19.1 | 1.3 | 310 | ◎ | ◎ |
| 50 | 2.9 | 47.8 | 33.1 | 12.0 | | 7.1 | | | | | | | 7.1 | 19.1 | 1.7 | 310 | ◎ | ◎ |
| 51 | 2.9 | 47.8 | 33.1 | 12.1 | | 7.0 | | | | | | | 7.0 | 19.1 | 1.7 | 310 | ◎ | ◎ |
| 52 | 2.9 | 44.5 | 29.0 | 15.0 | | 11.5 | | | | | | | 11.5 | 26.5 | 1.3 | 253 | ◎ | ◎ |
| 53 | 2.9 | 37.6 | 27.0 | 20.0 | | 15.4 | | | | | | | 15.4 | 35.4 | 1.3 | 255 | ◎ | ◎ |
| 54 | 2.9 | 48.9 | 33.1 | 10.2 | 6.2 | | | | | | 1.0 | | 7.2 | 17.4 | 1.4 | 307 | ◎ | ◎ |
| 55 | 2.9 | 48.9 | 33.1 | 10.2 | 6.2 | | | | | | | 1.0 | 7.2 | 17.4 | 1.4 | 307 | ◎ | ◎ |
| 56 | 2.9 | 48.9 | 33.1 | 10.2 | 5.2 | | | | | | 2.0 | | 7.2 | 17.4 | 1.4 | 300 | ◎ | ○ |
| 57 | 2.9 | 48.9 | 33.1 | 10.2 | 5.2 | | | | | | | 2.0 | 7.2 | 17.4 | 1.4 | 300 | ◎ | ○ |
| 58 | 2.9 | 48.9 | 33.1 | 10.2 | 4.2 | | | | | | 3.0 | | 7.2 | 17.4 | 1.4 | 300 | ◎ | Δ |
| 59 | 2.9 | 48.9 | 33.1 | 10.2 | 4.2 | | | | | | | 3.0 | 7.2 | 17.4 | 1.4 | 300 | ◎ | Δ |
| 60 | 3.0 | 55.0 | 30.0 | 8.5 | | 6.5 | | | | | | | 6.5 | 15.0 | 1.3 | 180 | ○ | ◎ |
| 61 | 3.0 | 47.8 | 33.1 | 12.1 | | 7.0 | | | | | | | 7.0 | 19.1 | 1.7 | 400 | ◎ | ◎ |

As shown in Tables 1 and 2, a sample having the total content of Li$_2$O and the additive of less than 15.2 mol % (Sample 1), a sample having the total content of Li$_2$O and the additive of over 45.0 mol % (Sample 3), a sample having the Li$_2$O content of over 20.0 mol % (Sample 2), and the sample having the total content of the additive of over 25.0 mol % (Sample 3) exhibited the insufficient load life performance.

Moreover, samples (Sample 3 to 6) in which the ratio (Y/X) of the Li$_2$O content to the total content of the additive was less than 1.3 or over 5.0 exhibited a poor load life performance even though the total content of Li$_2$O and the additive was 15.2 mol % or more to 17.2 mol % or more.

Furthermore, samples (Samples 7 and 8) in which the SiO$_2$ content was less than 35.0 mol % or over 69.8 mol %, and the B$_2$O$_3$ content is less than 15.0 mol % or over 49.8 mol % exhibited an insufficient load life performance. This is because excess or deficiency of the SiO$_2$ content and the B$_2$O$_3$ content could lead to deterioration in melting properties of the glass.

On the other hand, samples (Samples 9-24 and Samples 30-61) exhibited an excellent load life performance in which the SiO$_2$ content was 35.0 mol % or more to 69.8 mol % or less, the B$_2$O$_3$ content was 15.0 mol % or more to 49.8 mol % or less, the Li$_2$O content was 5.0 mol % or more to 20.0 mol % or less, the total content of the additive(s) was 2.6 mol % or more to 25.0 mol % or less, the total content of Li$_2$O and the additive(s) was 15.2 mol % or more to 45.0 mol % or less, and the ratio Y/X was 1.3 or more to 5.0 or less. Further, samples (Samples 25-29) in which the ratio Y/X was less than 1.3 but the total content of Li$_2$O and the additive was 17.2 mol % or more exhibited an excellent load life performance.

Particularly, the samples (Samples 30-61) in which the total content of Li$_2$O and the additive(s) was 17.2 mol % or more, and the ratio Y/X was 1.3 or more to 5.0 or less had the lifetime of 250 hours or more, which was an excellent load life performance.

Furthermore, focusing on samples (Samples 54-59) in which the content of K$_2$O or Na$_2$O varied, the samples (Samples 54-57) in which the content of K$_2$O or Na$_2$O was 2.0 mol % or less effectively restrained the variation in resistance of the resistor.

In addition, when the samples (Samples 60 and 61) each having the resistor with its outer diameter of 3.0 mm were compared to the samples (Samples 1 and 51) having the resistor that used the same glass powder as that of Samples 60, 61 and had the outer diameter of 2.9 mm, it was found that Samples 60, 61 exhibited the excellent load life performance. In other word, the load life performance may significantly deteriorate when the outer diameter of the resistor is less than 3.0 mm.

In view of the above-mentioned test results, the resistor is preferably made of the glass powder containing 35.0 mol % or more to 69.8 mol % or less SiO$_2$, 15.0 mol % or more to 49.8 mol % or less B$_2$O$_3$, 5.0 mol % or more to 20.0 mol % or less Li$_2$O, and at least one additive selected from MgO, CaO, SrO, BaO, Na$_2$O, K$_2$O, ZnO and ZrO$_2$ in a total of 2.6 mol % or more to 25.0 mol % or less. Further, the total content of Li$_2$O and the additive(s) in the glass powder is preferably 15.2 mol % or more to 45.0 mol % or less, and the ratio of the Li$_2$O content to the total content of the additive(s) is preferably 1.3 or more to 5.0. The resistor is preferably made of such glass powder in order to realize excellent load service life performance. Further, excellent load life performance may be achievable when employing the glass powder in which the total content of Li$_2$O and the additive(s) is 17.2 mol % or more to 45.0 mol % or less while maintaining the SiO$_2$ and B$_2$O$_3$ contents to be in the above mentioned ranges, without limiting the ratio of the Li$_2$O content to the total content of the additive(s).

Furthermore, in order to further improve the load life performance, it is preferable to use the glass powder that the ratio of the Li$_2$O content to the total content of the additive(s) be 1.3 or more to 5.0 or less, and the total content of Li$_2$O and the additive(s) in the glass powder be 17.2 mol % or more to 45.0 mol % or less, while maintaining the SiO$_2$ and B$_2$O$_3$ contents to be in the above mentioned ranges.

Moreover, excellent load life performance may be achievable through employing the glass powder having the above mentioned composition even when deterioration in load life performance is considered due to the outer diameter of the resistor to be less than 3.0 mm.

In addition, in order to restrain variation in resistance of the resistor among manufactured spark plugs, the content of Na$_2$O or K$_2$O is preferably less than 2.0 mol %, more preferably 1.0 mol % or less.

In addition, the present invention is not limited to the above-described embodiment, but may be embodied, for example, as follows. Of course, application examples and modifications other than those described below are also possible.

(a) In the above-mentioned embodiment, although the noble metal tip 32 is formed in the front end portion of the center electrode 5, a noble metal tip may be formed in the front end portion of the ground electrode 31 so as to face the noble metal tip 32. Further, a composition which omits the noble metal tip 32 at the center electrode 5 side, or a noble metal tip at the ground electrode 31 side may also be adopted. Furthermore, the both noble metal tips may be absent.

(b) In the above-mentioned embodiment, although $ZrO_2$ particles and $TiO_2$ particles are presented as ceramic particles 44, other ceramic particles may be employed. For example, aluminum oxide ($Al_2O_3$) particles or the like may also be employed.

(c) In the above-mentioned embodiment, although the resistor 7 disposed in the axial bore 4 has the outer diameter of less than 3.0 mm, the outer diameter of the resistor 7 may be 3.0 mm or more.

(d) According to the above-described embodiment, the ground electrode 31 is joined to the front end portion of the metallic shell 3. However, a portion of the metallic shell (or a portion of a front-end metal piece welded beforehand to the metallic shell) may be cut so as to form the ground electrode (e.g., Japanese Patent Application Laid-Open (kokai) No. 2006-236906).

(e) In the above-described embodiments, the tool engagement portion 23 has a hexagonal cross section. However, the shape of the tool engagement portion 23 is not limited thereto. For example, the tool engagement portion may have a Bi-Hex (deformed dodecagon) shape [ISO22977: 2005(E)] or the like.

DESCRIPTION OF REFERENCE NUMERALS

1: Spark plug (spark plug for internal-combustion engines)
2: Ceramic insulator (Insulator)
3: Metallic shell
4: Axial bore
5: Center electrode
6: Terminal electrode
7: Resistor
41: Glass
43: Carbon black (conductive material)
56: Resistor composition
CL1: Axis

What is claimed is:

1. A spark plug for internal-combustion engines, comprising:
    a cylindrical insulator having an axial bore that penetrates in an axial direction;
    a center electrode inserted in one end of the axial bore;
    a terminal electrode inserted in another end of the axial bore;
    a cylindrical metallic shell provided on an outer circumference of the insulator; and
    a resistor made of at least a conductive material and glass, said resistor electrically connecting the center electrode to the terminal electrode in the axial bore,
    wherein the resistor is formed by heat-sealing of a resistor composition that contains at least the conductive material and glass powder,
    wherein the glass powder contains 35.0 mol % or more to 69.8 mol % or less silica dioxide, 15.0 mol % or more to 49.8 mol % or less boron oxide, 5.0 mol % or more to 20.0 mol % or less lithium oxide,
    wherein the glass powder contains at least one additive selected from a magnesium oxide, a calcium oxide, a strontium oxide, a barium oxide, a sodium oxide, an potassium oxide, a zinc oxide and a zirconium dioxide in a total of 2.6 mol % or more to 25.0 mol % or less,
    wherein the total content of lithium oxide and the additive(s) is 15.2 mol % or more to 45.0 mol % or less, and
    wherein a mol % ratio of the lithium oxide content to the total content of the additive(s) is between 1.3 and 5.0.

2. A spark plug for internal-combustion engines, comprising:
    a cylindrical insulator having an axial bore that penetrates in an axial direction;
    a center electrode inserted in one end of the axial bore; a terminal electrode inserted in another end of the axial bore;
    a cylindrical metallic shell provided on an outer circumference of the insulator; and
    a resistor made of at least a conductive material and glass, said resistor electrically connecting the center electrode to the terminal electrode in the axial bore,
    wherein the resistor is formed by heat-sealing of a resistor composition that contains at least the conductive material and glass powder,
    wherein the glass powder contains 35.0 mol % or more to 69.8 mol % or less silica dioxide, 15.0 mol % or more to 49.8 mol % or less boron oxide, 5.0 mol % or more to 20.0 mol % or less lithium oxide,
    wherein the glass powder contains at least one additive selected from a magnesium oxide, a calcium oxide, a strontium oxide, a barium oxide, a sodium oxide, an potassium oxide, a zinc oxide and a zirconium dioxide in a total of 2.6 mol % or more to 25.0 mol % or less, and
    wherein the total content of lithium oxide and the additive(s) is 17.2 mol % or more to 45.0 mol % or less.

3. The spark plug for internal-combustion engines according to claim 1, wherein the total content of lithium oxide and the additive(s) in the glass powder is 17.2 mol % or more to 45.0 mol % or less.

4. The spark plug for internal-combustion engines according to claim 1, wherein the total content of sodium oxide and potassium oxide in the glass powder is 2.0 mol % or less.

5. The spark plug for internal-combustion engines according to claim 1, wherein an outer diameter of the resistor is less than 3.0 mm.

6. The spark plug for internal-combustion engines according to claim 2, wherein the total content of sodium oxide and potassium oxide in the glass powder is 2.0 mol % or less.

7. The spark plug for internal-combustion engines according to claim 3, wherein the total content of sodium oxide and potassium oxide in the glass powder is 2.0 mol % or less.

8. The spark plug for internal-combustion engines according to claim 2, wherein an outer diameter of the resistor is less than 3.0 mm.

9. The spark plug for internal-combustion engines according to claim 3, wherein an outer diameter of the resistor is less than 3.0 mm.

10. The spark plug for internal-combustion engines according to claim 4, wherein an outer diameter of the resistor is less than 3.0 mm.

* * * * *